United States Patent
Adradi

(10) Patent No.: US 8,301,366 B2
(45) Date of Patent: Oct. 30, 2012

(54) VEHICLE SPEED DETERMINATION FROM AUDIO INPUT FOR DEAD RECKONING DETERMINATION IN A PORTABLE NAVIGATION DEVICE

(75) Inventor: Dris Adradi, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 470 days.

(21) Appl. No.: 12/613,511

(22) Filed: Nov. 5, 2009

(65) Prior Publication Data

US 2011/0106440 A1    May 5, 2011

(51) Int. Cl.
*G01C 21/30* (2006.01)
*G01C 21/32* (2006.01)
*G01C 21/00* (2006.01)
*G01S 1/00* (2006.01)
*G01S 5/02* (2006.01)

(52) U.S. Cl. .......................... 701/208; 701/472

(58) Field of Classification Search .............. 701/208, 701/472

See application file for complete search history.

(56) References Cited

U.S. PATENT DOCUMENTS

| | | | |
|---|---|---|---|
| 6,401,028 B1* | 6/2002 | Kamiya et al. | 701/441 |
| 2008/0243373 A1* | 10/2008 | Cat et al. | 701/207 |
| 2010/0057465 A1* | 3/2010 | Kirsch et al. | 704/260 |

* cited by examiner

*Primary Examiner* — Thomas Tarcza
*Assistant Examiner* — Imran Mustafa
(74) *Attorney, Agent, or Firm* — Winston Hsu; Scott Margo

(57) ABSTRACT

A portable navigation device displaying map information and navigation instructions for use in a vehicle is disclosed. The portable navigation device includes a memory, a display for displaying the map information and navigation instructions, and a microphone for inputting sound signals to the portable navigation device. A processor is used for controlling operation of the portable navigation device and for determining the speed of the vehicle. To determine the speed, the processor receives the sound signals input by the microphone, analyzes the sound signals, determines a speed at which the vehicle is moving according to characteristics of the analyzed received sound signals when not receiving Global Positioning System (GPS) signals with the portable navigation device, and estimates a current location of the vehicle based on the determined speed of the vehicle.

20 Claims, 3 Drawing Sheets

VEHICLE SPEED DETERMINATION FROM AUDIO INPUT FOR DEAD RECKONING DETERMINATION IN A PORTABLE NAVIGATION DEVICE

BACKGROUND OF THE INVENTION

1. Field of the Invention

The invention relates to a portable navigation device used to make a dead reckoning determination, and more particularly, to a portable navigation device utilizing an audio input to determine a vehicle's speed and thereby make a dead reckoning determination.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

Dead reckoning is the process of estimating one's current position based upon a previously determined position, and advancing that position based upon known speed, elapsed time, and course. With respect to GPS navigation devices, dead reckoning allows continued navigation in the event of a loss of GPS satellite reception, or when navigating in conditions that make GPS-based positioning unreliable. Loss of GPS satellite reception occurs when driving through areas with no clear view of the sky, such as when in tunnels. GPS receivers an also produce erroneous position information when navigating through dense "urban canyons" surrounded by tall buildings, such as in large cities.

The elapsed time since a last reliable GPS signal was received is easy to measure, and an expected course of the GPS navigation device can be assumed based on a calculated route to a destination programmed by the user. Estimating the vehicle's speed, on the other hand, is not as easy to determine when GPS signals cannot be received. In contrast, when GPS signals are being received, the GPS signals will provide enough information such that the GPS navigation device will be able to calculate the vehicle's current speed. Traditionally, determining a vehicle's speed without relying upon received GPS signals is achieved by taking a tap off of the vehicle speed sensor wiring and feeding this through some signal conditioning to a processor which calculates the vehicle's speed.

Please refer to FIG. 1. FIG. 1 is a diagram of a portable navigation device 10 connected to a vehicle's wiring loom 20 according to the prior art. The portable navigation device 10 traditionally contains a display 12 for displaying map information and has a plurality of control buttons 14 for enabling a user to operate the portable navigation device 10. As stated above, in order to provide information about the vehicle's speed to the portable navigation device 10, the portable navigation device 10 must be connected to wiring in the vehicle's wiring loom 20. First of all, a protection/isolation circuit 26 is connected to both the vehicle power 22 and the vehicle speed sensor 24 of the vehicle's wiring loom 20. The protection/isolation circuit 26 obtains speed information from the vehicle speed sensor 24 and provides this speed information to a signal conditioning circuit 28 which conditions the speed signals for use in the portable navigation device 10.

Unfortunately, the prior art portable navigation device 10 has several shortcomings when having to connect to the vehicle's wiring loom 20. First of all, tapping into the vehicle's wiring loom requires a level of expertise that is beyond what most consumers are comfortable with. The second problem is that consumers are fastidious regarding wires and cables to and from devices as they prefer clean and tidy wires. A third issue is related to the cost of the portable navigation device 10, and the use of the protection/isolation circuit 26, the signal conditioning circuit 28, and the connecting wires needed to read the vehicle speed add extra cost to the overall cost of the portable navigation device 10.

SUMMARY OF THE INVENTION

It is therefore one of the primary objectives of the claimed invention to provide a portable navigation device having an integrated microphone for determining a vehicle's speed according to sound signals detected by the microphone.

According to an exemplary embodiment of the claimed invention, a portable navigation device displaying map information and navigation instructions for use in a vehicle is disclosed. The portable navigation device includes a memory, a display for displaying the map information and navigation instructions, and a microphone for inputting sound signals to the portable navigation device. A processor is used for controlling operation of the portable navigation device and for determining the speed of the vehicle. To determine the speed, the processor receives the sound signals input by the microphone, analyzes the sound signals, determines a speed at which the vehicle is moving according to characteristics of the analyzed received sound signals when not receiving Global Positioning System (GPS) signals with the portable navigation device, and estimates a current location of the vehicle based on the determined speed of the vehicle.

According to another exemplary embodiment of the claimed invention, a method of estimating a speed of a vehicle using a portable navigation device that is used for displaying map information and navigation instructions is disclosed. The portable navigation device includes a memory and a display for displaying the map information and navigation instructions. The method includes inputting sound signals to the portable navigation device through a microphone, analyzing the sound signals input by the microphone, determining a speed at which the vehicle is moving according to characteristics of the analyzed received sound signals when not receiving Global Positioning System (GPS) signals with the portable navigation device, and estimating a current location of the vehicle based on the determined speed of the vehicle.

It is an advantage of the claimed invention that no extra hardware is needed for the portable navigation device to calculate the vehicle's speed when GPS signals cannot be received. It is another advantage that the user does not need to

DETAILED DESCRIPTION

The present invention provides a simplified method to determine the speed of a vehicle that a portable navigation device is placed in when GPS signals cannot be received by the navigation device. The present invention advantageously makes use of hardware already present in a typical personal navigation device, and eliminates the need for connecting wires to a vehicle's wiring loom.

Figure 1:
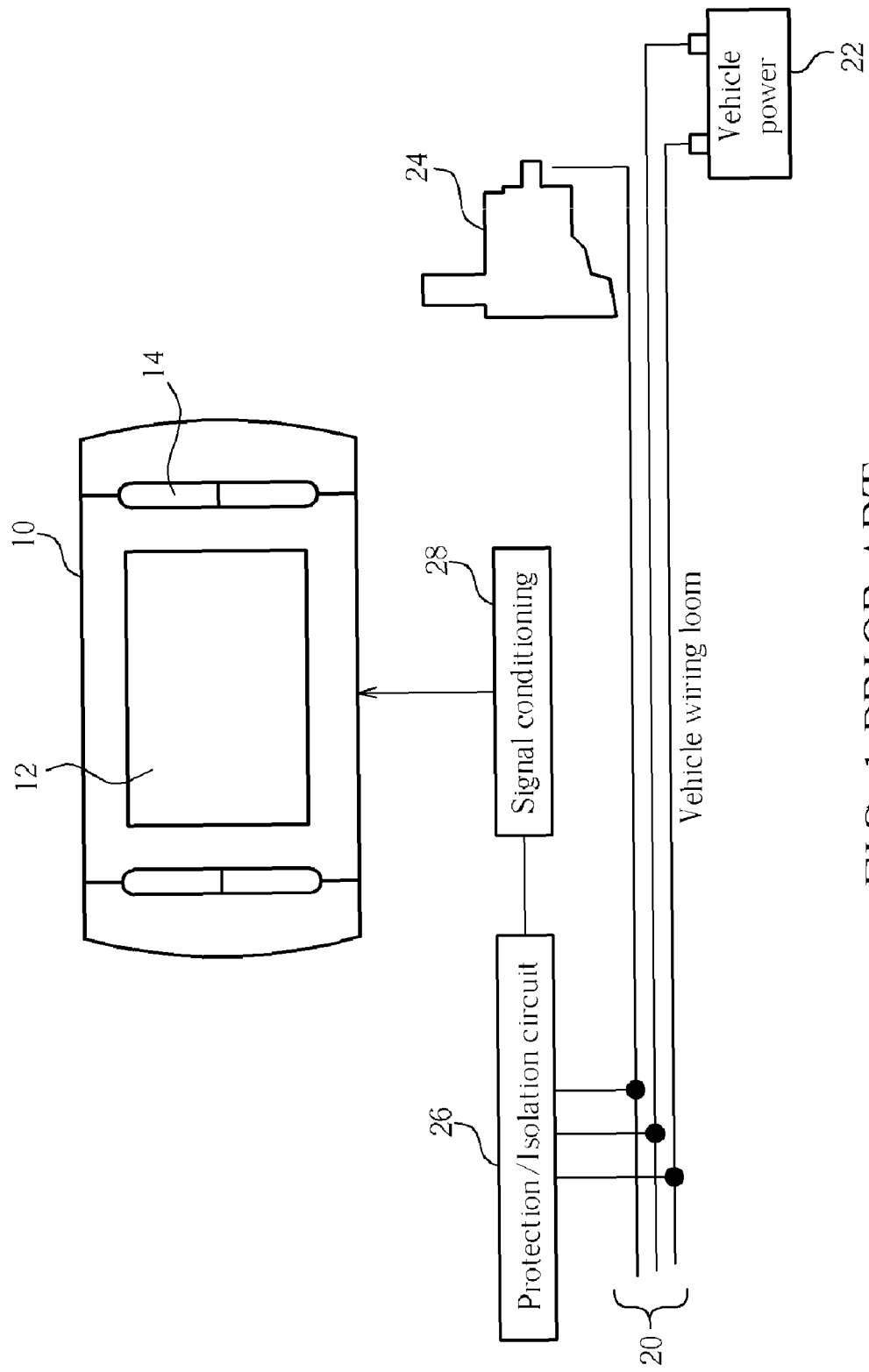
FIG. 1 is a diagram of a portable navigation device connected to a vehicle's wiring loom according to the prior art.
Figure 2:
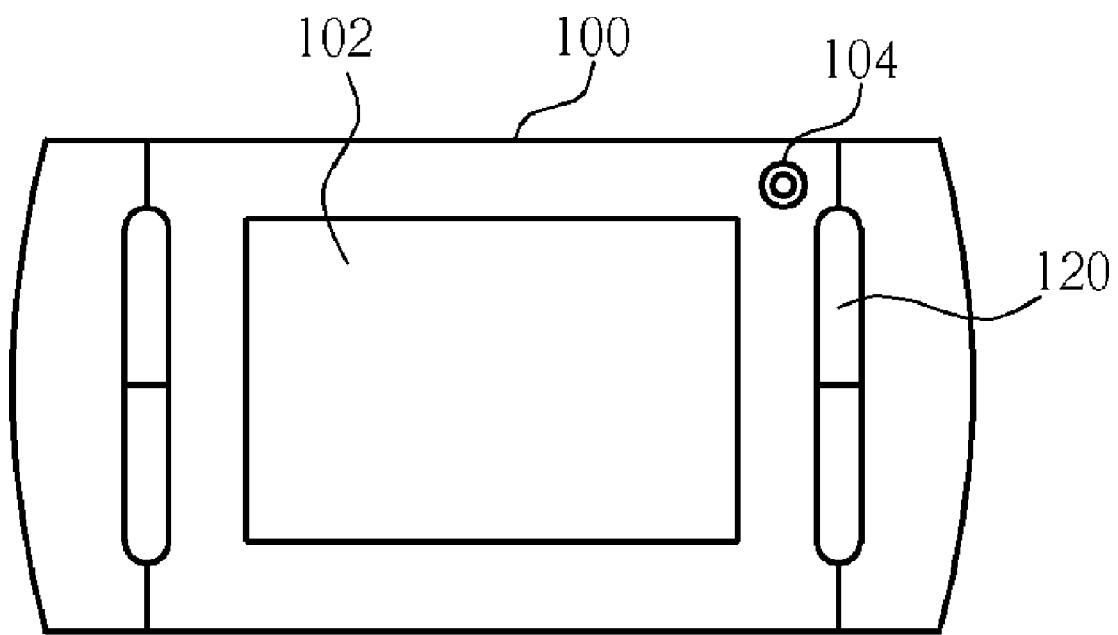
FIG. 2 is a diagram of a portable navigation device containing a microphone used to determine a vehicle's speed according to the present invention.

Please refer to FIG. 2. FIG. 2 is a diagram of a portable navigation device 100 containing a microphone 104 used to determine a vehicle's speed according to the present invention. Like conventional portable navigation devices, the portable navigation device 100 contains a display 102 for displaying map information and has a plurality of control buttons 120 for enabling a user to operate the portable navigation device 100. Differing from the conventional portable navigation device 10, the portable navigation device 100 of the present invention utilizes the microphone 104 for obtaining sound signals from inside the vehicle, analyzing the sound signals, and thereby determining a speed at which the vehicle is moving. Once the speed of the vehicle is obtained, dead reckoning calculations can be made to estimate the current location of the vehicle using the determined speed, the elapsed time since a last reliable GPS signal was received, and the course of the vehicle.

Figure 3:
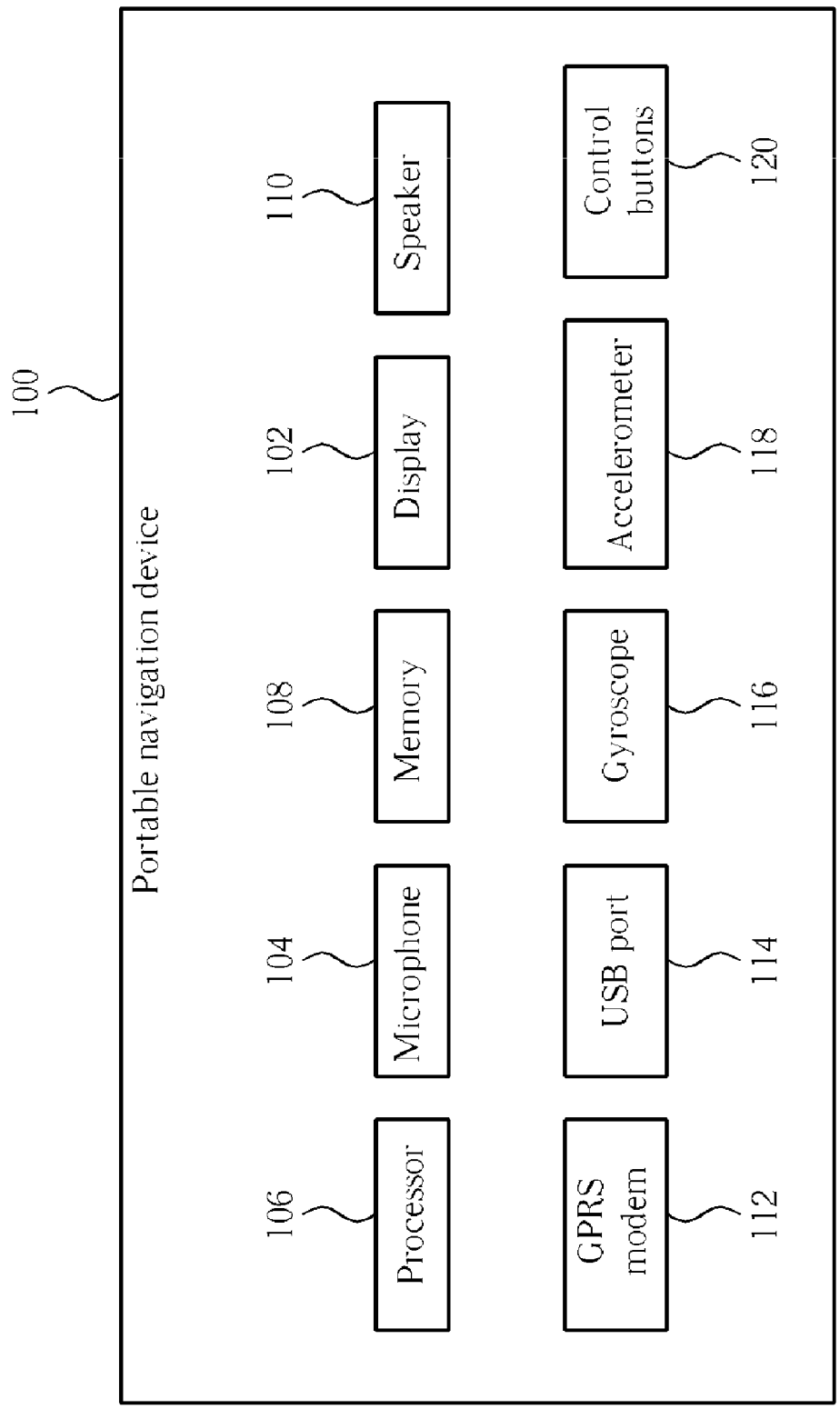
FIG. 3 is a functional block diagram of the portable navigation device according to the present invention.

Please refer to FIG. 3. FIG. 3 is a functional block diagram of the portable navigation device 100 according to the present invention. The portable navigation device 100 additionally contains a processor 106 for analyzing the sound signals received from the microphone 104, determining the speed at which the vehicle is moving according to the analyzed received sound signals, and estimating a current location of the vehicle based on the determined speed of the vehicle. A memory 108 is used to store map and route information, as well as software executed by the processor 106. A speaker 110 can be used to output audio messages to a user, such as indications that a required turn is quickly approaching. The portable navigation device 100 optionally contains a General Packet Radio Service (GPRS) modem 112, a Universal Serial Bus (USB) port 114, a gyroscope 116, or an accelerometer 118, as will be explained below.

The portable navigation device 100 utilizes the microphone 104 to determine the vehicle's speed. The determined speed can then be used as one of the inputs in a dead reckoning system for estimating a current location of the vehicle when no reliable GPS satellite signal is received. In general, ambient noise in a vehicle is directly related to the speed of the vehicle. Because of this, the microphone 104 is used to create a digitized audio signal based on the ambient noise. The digitized audio signal is then provided to the processor 106 for analyzing the digitized audio signal. To increase the accuracy of the results, the processor 106 can choose to analyze only those sound signals of a predetermined range of sound frequencies. In this way, only those sounds that are related to the vehicle's speed will be considered, and other frequencies that might be made by the vehicle's stereo system or by the voices of the vehicle's passengers can be ignored. Since the vehicle can create different pitched noises as the speed changes, the processor 106 can also be programmed to adjust the predetermined range of sound frequencies being analyzed according to the currently determined speed of the vehicle. Additionally, the processor 106 can also utilize noise-canceling technology for ignoring a portion of the ambient noise in the vehicle, and focusing only on those noises that are directly related to the engine speed.

The GPRS modem 112 can be used to download data models that are related to a particular vehicle make and model. These data models may be provided by the manufacturer of the vehicle or by other drivers of the same vehicle who have submitted their data models to a server. Alternatively, the USB port 114 can be used to connect the portable navigation device 100 to an external computer and for downloading the data models onto the portable navigation device 100 through the external computer. In either case, once the data models are present on the portable navigation device 100, the data models can aide the processor 106 in its analysis of the sound signals provided by the microphone 104. Please note that other types of communication devices besides the GPRS modem and other types of bus standards besides USB can also be used with the present invention.

In addition to determining the vehicle's speed, the portable navigation device 100 can also be used to detect any turns or changes in direction made by the vehicle when no GPS signals are received by the portable navigation device 100. One way in which this can be accomplished is by using a stereo microphone in place of the microphone 104. The stereo microphone can be used to detect first and second sound signals at two different locations in the vehicle, such as the front-left side and the front-right side of the vehicle. The first sound signals can then be compared with the second sound signals to determine if any differences arise. These differences can result from the vehicle making a left turn or a right turn, which would cause the sounds made at the left and right sides of the vehicle to differ. A gyroscope or an accelerometer can also be used for detecting acceleration or changes in direction made by the vehicle. Once the processor 106 determines turning information, the turning information can be considered together with the determined speed to estimate the velocity (speed and direction) of the vehicle. The velocity can lead to better dead reckoning estimations of the current location of the vehicle than using the speed alone.

In summary, the present invention portable navigation device 100 provides a way to estimate the speed of a vehicle for producing dead reckoning position estimations while at the same time eliminating the need for extra hardware and the need to connect any wires to a vehicle's wiring loom. As a result, the portable navigation device 100 offers a simple and inexpensive way to estimate the current position of a vehicle using dead reckoning.

Those skilled in the art will readily observe that numerous modifications and alterations of the device and method may be made while retaining the teachings of the invention.

What is claimed is:

1. A portable navigation device displaying map information and navigation instructions for use in a vehicle, the portable navigation device comprising:
   a memory;
   a display for displaying the map information and navigation instructions;
   a microphone for inputting sound signals to the portable navigation device; and
   a processor for controlling operation of the portable navigation device, the processor receiving the sound signals input by the microphone, analyzing the sound signals, determining a speed at which the vehicle is moving according to characteristics of the analyzed received sound signals when not receiving Global Positioning System (GPS) signals with the portable navigation device, and estimating a current location of the vehicle based on the determined speed of the vehicle, wherein analyzing the sound signals is performed by comparing the sound signals to a data model containing sound information related to a particular make and model of the vehicle, the speed at which the vehicle is moving being determined according to the comparison between the sound signals and sound information contained in the data model.

2. The portable navigation device of claim 1, wherein the microphone is a stereo microphone for inputting first sound signals and second sound signals from two different locations in the vehicle, the processor comparing the first sound signals and the second sound signals and determining if the vehicle is turning according to a result of the comparison.

3. The portable navigation device of claim 1, wherein the processor analyzes sound signals of a predetermined range of sound frequencies that are related to the speed of the vehicle.

4. The portable navigation device of claim 3, wherein the processor adjusts the predetermined range of sound frequencies according to a currently determined speed of the vehicle.

5. The portable navigation device of claim 1, wherein the processor utilizes noise-canceling technology for ignoring a portion of the ambient noise in the vehicle and focusing on noises related to the engine speed.

6. The portable navigation device of claim 1 further comprising a General Packet Radio Service (GPRS) modem for downloading the data model.

7. The portable navigation device of claim 1 further comprising a communications port for enabling communication between the portable navigation device and an external computer, the portable navigation device downloading the data model through the communications port.

8. The portable navigation device of claim 7, wherein the communications port is a Universal Serial Bus (USB) port.

9. The portable navigation device of claim 1 further comprising a gyroscope for detecting acceleration or changes in direction made by the vehicle, the processor estimating the current location of the vehicle based on the determined speed of the vehicle and the detected acceleration or changes in direction.

10. The portable navigation device of claim 1 further comprising an accelerometer for detecting acceleration or changes in direction made by the vehicle, the processor estimating the current location of the vehicle based on the determined speed of the vehicle and the detected acceleration or changes in direction.

11. A method of estimating a speed of a vehicle using a portable navigation device that is used for displaying map information and navigation instructions, the portable navigation device comprising a memory and a display for displaying the map information and navigation instructions, the method comprising:
   inputting sound signals to the portable navigation device through a microphone;
   analyzing the sound signals input by the microphone, wherein analyzing the sound signals is performed by comparing the sound signals to a data model containing sound information related to a particular make and model of the vehicle;
   determining a speed at which the vehicle is moving according to characteristics of the analyzed received sound signals when not receiving Global Positioning System (GPS) signals with the portable navigation device, wherein the speed at which the vehicle is moving is determined according to the comparison between the sound signals and sound information contained in the data model; and
   estimating a current location of the vehicle based on the determined speed of the vehicle.

12. The method of claim 11, wherein the microphone is a stereo microphone, and the method further comprises:
   utilizing the stereo microphone to input first sound signals and second sound signals from two different locations in the vehicle;
   comparing the first sound signals and the second sound signals; and
   determining if the vehicle is turning according to a result of the comparison.

13. The method of claim 11, wherein analyzing the sound signals input by the microphone comprises analyzing sound signals of a predetermined range of sound frequencies that are related to the speed of the vehicle.

14. The method of claim 13 further comprising adjusting the predetermined range of sound frequencies according to a currently determined speed of the vehicle.

15. The method of claim 11 further comprising utilizing noise-canceling technology for ignoring a portion of the ambient noise in the vehicle and focusing on noises related to the engine speed.

16. The method of claim 11, wherein the portable navigation device further comprises a General Packet Radio Service (GPRS) modem, and the method further comprises:
   downloading the data model through the GPRS modem.

17. The method of claim 11, wherein the portable navigation device further comprises a communications port for enabling communication between the portable navigation device and an external computer, and the method further comprises:
   the portable navigation device downloading the data model through the communications port.

18. The method of claim 17, wherein the communications port is a Universal Serial Bus (USB) port.

19. The method of claim 11, wherein the portable navigation device further comprises a gyroscope for detecting acceleration or changes in direction made by the vehicle, and the method further comprises estimating the current location of the vehicle based on the determined speed of the vehicle and the detected acceleration or changes in direction.

20. The method of claim 11, wherein the portable navigation device further comprises an accelerometer for detecting acceleration or changes in direction made by the vehicle, and the method further comprises estimating the current location of the vehicle based on the determined speed of the vehicle and the detected acceleration or changes in direction.

* * * * *